United States Patent [19]

Yin et al.

[11] 4,257,816

[45] Mar. 24, 1981

[54] NOVEL BLEND OF ALGIN, TKP, AND GUAR GUM

[75] Inventors: Robert I. Yin, La Jolla; Jerry G. Lewis, San Diego, both of Calif.

[73] Assignee: Merck & Co., Inc., Rahway, N.J.

[21] Appl. No.: 75,871

[22] Filed: Sep. 17, 1979

[51] Int. Cl.$^3$ .............................................. C08L 5/04
[52] U.S. Cl. .................................... 106/208; 106/125; 106/129; 106/135; 106/137; 106/138; 106/157; 106/193 J; 106/197 C; 106/197 R; 106/205; 106/209; 106/316
[58] Field of Search ............... 106/205, 209, 316, 208, 106/129, 193 J

[56] References Cited

U.S. PATENT DOCUMENTS

| | | | |
|---|---|---|---|
| 3,399,189 | 8/1968 | Gordon | 260/209 |
| 3,503,769 | 3/1970 | McDowell | 106/208 |
| 4,089,646 | 5/1978 | Habereder et al. | 8/7 |

OTHER PUBLICATIONS

Hackh's Chemical Dictionary, Fourth Edition, McGraw-Hill, 1970, p. 25.
Chemical Abstracts, vol. 73, 1970, 110, 815j.

*Primary Examiner*—Allan Lieberman
*Attorney, Agent, or Firm*—Gabriel Lopez; Hesna J. Pfeiffer; Julian S. Levitt

[57] ABSTRACT

Novel blends of algin, TKP and guar gum are disclosed. The blends are useful in commercial gum applications where thickening, suspending, emulsifying, stabilizing, film-forming, and gel-forming properties are needed. They are particularly useful in the paper industry.

19 Claims, No Drawings

NOVEL BLEND OF ALGIN, TKP, AND GUAR GUM

CROSS-REFERENCE

CWSTG is taught and claimed in copending application U.S. Ser. No. 959,120, filed Nov. 9, 1978, entitled "Cold-Water Soluble Tamarind Gum." Said application is incorporated herein by reference for its teaching of how to make CWSTG.

BACKGROUND OF THE INVENTION

Algin is a water-soluble polysaccharide found in all species of Phaeophyceae, brown algae. The generic term algin designates the derivatives of alginic acid chemically extracted from Phaeophyceae. The derivatives of alginic acid include varied soluble salts (e.g., sodium alginate) and salts of ethers (e.g., propylene glycol alginate); these derivatives, i.e., algin, are stored in their dry-powdered form. Algin is used in commercial gum applications for its thickening, suspending, emulsifying, stabilizing, adhesive, film-forming, and gel-forming properties.

Tamarind kernal powder is a commercially available product made by husking and milling the seed kernels of the tree *Tamarindus indica Linn*.

Guar gum is a commercially available product which is essentially the endosperm of the plant *Cyanaposis tetragonolobus*, family Leguminosae. Guar gum is used extensively as an additive in paper manufacturing as an aid in fiber-fiber bonding. Guar gum is also used as a flocculating agent in the mining industry since it flocculates clays, carbonates, hydroxides and silica.

SUMMARY OF THE INVENTION

It has now been found that a novel blend of algin, TKP (defined below), and guar gum can be used in a size press solution or in a pigmented paper coating formulation. Surprisingly, there is no evidence of flocculation in such a formulation even when clay is used as the pigment.

The ratio of algin:(TKP plus guar gum) on a weight:weight basis can range in said novel blend from about 90:10 to about 5:95.

The amounts of each gum in said novel blend can range, based on weight, as follows:

|          |         |
|----------|---------|
| algin    | 5%–90%  |
| TKP      | 5%–90%  |
| guar gum | 5%–90%  |

The novel blend of this invention develops very good viscosity and exhibits film-forming, ink holdout, and water retention properties (recognized parameters in the paper industry). It also exhibits good tensile strength and elongation of properties of films (recognized parameters for warp sizing used in the textile industry). Blends low in algin are preferred; i.e., algin:(TKP+guar gum)<50:50. Most preferred are blends in the range 20:80 to 5:95. A most preferred blend is 20:50:30, algin:TKP:guar gum. Insofar as the gums themselves are concerned, high viscosity sodium alginate and cold-water soluble tamarind gum are preferred.

DETAILED DESCRIPTION OF THE INVENTION

As used herein, algin is a generic designation for alginic acid and derivatives of alginic acid, including soluble salts (specifically sodium alginates) and soluble salts of its ethers (specifically propylene glycol alginates).

As used herein, TKP refers to (1) tamarind kernel powder, a commercially available product obtained from the seed kernels of the tree *Tamarindus indica Linn;* (2) cold-water soluble tamarind kernal powder (CWSTG) prepared by mixing crude tamarind kernal powder in water at a concentration of 0.1 to 75.0% (preferably 20–50%), heating the solution to a temperature of 35°–130° C. (preferably 70°–100° C.) until a paste is formed, then drying and milling the resulting product, which is cold water soluble tamarind kernal powder; (3) purified tamarind kernel powder as taught by U.S. Pat. No. 3,399,189 for obtaining the tamarind polysaccharide extract and by U.S. Pat. No. 3,287,350 for extraction of the tamarind polysaccharide as tamarind seed jellose (TSJ); and (4) other tamarind kernel powder constituents, i.e., the residual after the tamarind polysaccharide has been removed, viz, a combination of proteins, fiber, fat, inorganic salts, free sugars, and tannins.

Algin, TKP and guar gum can be blended to any desired ratio and stored as a blend until needed. These three components may be combined, each as a dry powder and stored as a dry-powder blend, or they initially may be put separately into solution and then the three solutions blended and stored as a wet blend or the separate solutions may be combined in the final formulation. The dry blends can be weighed and combined with other ingredients or first dissolved prior to further use. As tamarind kernel powder is not soluble in cold water, its entry into solution requires heating to approximately 82° C. Agitation by a mixer may also be required to put algin and TKP into solution. Guar gum is readily soluble in cold water although some grades may require up to 24 hours to develop maximum viscosity. In the wet blend, solutions in the range preferably of 0.5% to 10.0% of each component are prepared and then added together to attain the desired blend ratio. Final concentrations of the blend ranging from approximately 0.5% to 10.0% then can be prepared depending on the intended end use (for example, concentrations of 0.9% to 4.0% are typical of blends in the paper industry). Solutions lower than 0.5% and higher than 10% may also be prepared.

Blends of algin, TKP, and guar yield high viscosities in aqueous solutions when compared to the predicted viscosities resulting from addition of the individual viscosities of the three components blended in solution.

The blends of algin, TKP, and guar gum have utility as additives for: thickening, suspending, emulsifying, stabilizing, gelling, lubricating, film-forming, and binding. In particular, the blends can be used in the following applications or products: textile printing, can sealing, boiler compounds, latex creaming, welding-rod fluxes, brazing pastes, ceramic glazes and extrusions, cleaners and polishes, toys, emulsions (latex, asphalt, silicone), silver recovery, seed coatings, spray control for pesticides, emulsifiable concentrated and flowable pesticides, tobacco binders, water-based inks, lithographic fountain solutions, leather finishes, hydromulching and hydroseeding, textile printing and finishing, wet-end paper additives, wet-end paper retention and formation aids, anti-stick compounds, mold-release agents, liquid resins, slurry and packaged explosives, petroleum and water-well drilling muds, petroleum stimulation fluids, cosmetics, pharmaceutical suspensions and emulsions. This list is suggestive of the possible types of application in which these blends can be used.

The blends of algin, TKP, and guar gum are particularly useful in formulations used for paper coating and surface sizing.

Table I presents various application of the novel blend of this invention in the printing and paper industry. Percentages of the blend recommended for usage in a wide variety of coatings is shown for both pigmented and non-pigmented coating.

TABLE I

| Coating | Major Ingredient (Parts by Weight) | | % Blend[1] | | % Total Solid | |
|---|---|---|---|---|---|---|
| | Pigment[2] | Binder[3] | Useful Range | Preferred | Useful Range | Preferred |
| Non-Pigmented | | | | | | |
| 1. Calender Box | —[4] | 0–100 | 0.01–25 | 0.01–10 | 0.05–30 | 0.2–15 |
| 2. Size Press | — | 0–100 | 0.01–35 | 0.01–15 | 0.1–30 | 5–15 |
| 3. Blade Coater | — | 0–100 | 0.01–60 | 0.01–25 | 0.1–25 | 5–25 |
| Pigmented | | | | | | |
| 1. Wet-end Coater | 100 | 10–100 | 0.1–200 | 0.2–100 | 5–50 | 35–45 |
| 2. Size Press Coater | 100 | 3–30 | 0.1–200 | 0.1–3.0 | 5–60 | 25–50 |
| 3. Calender Box | 100 | 3–30 | 0.1–200 | 0.1–3.0 | 5–60 | 25–50 |
| 4. Roll Coater | 100 | 3–30 | 0.01–35 | 0.05–1.5 | 20–72 | 50–62 |
| 5. Air Knife Coater | 100 | 3–30 | 0.01–35 | 0.05–1.5 | 30–67 | 38–60 |
| 6. Blade Coater | 100 | 3–30 | 0.01–35 | 0.05–1.5 | 2–72 | 30–68 |
| 7. Rod Coater | 100 | 3–30 | 0.01–35 | 0.05–1.5 | 30–72 | 55–65 |
| 8. Cast Coater | 100 | 8–30 | 0.01–35 | 0.05–1.5 | 35–70 | 40–62 |
| 9. Gravure Coater | 100 | 3–30 | 0.01–35 | 0.05–1.5 | 35–72 | 40–64 |

[1]Values for non-pigmented coating are based on the total weight of coating; for pigmented coatings on the amount of pigment.
[2]Pigments include clay, $TiO_2$, $CaCO_3$, satin white, talc, etc.
[3]Binders include latex, casein, soya protein, starch, HEC, CMC, animal glue, etc.
[4]Minute amounts of pigment are often used for the purpose of filling the paper.

In the examples, reference is made to the following tests, all of which are recognized in the paper industry. Parenthetical references are to standards of the Technical Association of the Pulp and Paper Industry, Inc., 1 Dunwoody Park, Atlanta, Ga., 30338.

1. K & N ® Mottle Test: the ink holdout property of a coating, i.e., estimates of resistance of a sheet of paper or paperboard to the penetration of ink and varnish are obtained by this method. A drop of K & N gray oil-based ink is allowed to remain on a sample of treated paper and then the excess is wiped off. Poor ink film leveling gives a mottled appearance to the paper, which is rated on a scale of 0 to 10 (poor to good). (TAPPI 553)
K & N is a registered trademark of K & N Laboratories, Inc., 5331 Donsher Rd., Countryside, Ill., 60525.

2. IGT Ink Drop Test: this test measures pick resistance of paper by close simulation of the printing process. It simulates the ink holdout of a paper surface subjected to printing press nip pressure conditions (i.e., pick resistance of the paper). The spread size (in $mm^2$) of 0.3 ml of dibutylphtalate is measured on an IGT printability tester (Research Institute for Printing & Allied Industries TNO, P.O. Box 4150, Amsterdam, Holland) at B setting, 40 kg nip pressure. Larger spread size indicates better ink holdout, which is desirable for gravure, litho, and letter-press applications. (TAPPI T499 su-64).

3. IGT Pick Test: this test measures the coated surface strength when it is printed with a specific tack-grade ink or Polybutene on an IGT tester. A higher reading means better coating strength. (TAPPI T-499).

4. Quick Peek Varnish Gloss: The test involves printing 0.02 $mm^3$ volume of gloss varnish distributed on 15,958 $mm^2$ area to the sample surface. After the varnish is dried, the measurement is made on the reflection gloss (TAPPI T-480).

The invention is further described in the following examples which should not be construed as limiting.

EXAMPLE 1

20:50:30 Gum Blend

A blend of 20:50:30 high viscosity sodium alginate (KELGIN ® HV):cold-water soluble tamarind gum:-guar gum (General Mills Chemical, Inc.) is prepared by dry mixing the indredients and then dissolving the mix in deionized water.

Using this blend, a pigmented coating formulation is prepared having the following composition:

| | Parts |
|---|---|
| Clay HT, No. 1 coating grade | 100 |
| Calgon ®, tetrasodium pyrophosphate | 0.2 |
| Dispex ® N40, organic dispersant | 0.2 |
| Dow 638 Latex ®, latex binder | 15 |
| Gum blend | 0.4 |

®Kelgin is a registered trademark of Kelco, Division of MERCK & CO., Inc. CALGON is a registered trademark of MERCK & CO., Inc. DISPLEX is a registered trademark of Allied Colloids, Inc. DOW LATEX is a registered trademark of Dow Chemical Co., USA.

The pH is adjusted to 9±0.2 with ammonia.

A control formulation is prepared as above, omitting the use of the gum blend.

The viscosity data of Table II are obtained.

TABLE II

| | 20:50:30 Gum Blend Viscosities | | |
|---|---|---|---|
| | Brookfield LVF Model | | |
| | Viscosity (cP) | | % Coating |
| | 6 rpm | 60 rpm | Solid |
| w/gum blend | 2100 | 360 | 45 |
| | 4400 | 660 | 50 |
| | 15000 | 2750 | 60 |
| w/o gum blend | 25 | 15 | 45 |
| | 100 | 30 | 50 |

Viscosities are determined on a Brookfield LVF viscometer. Readings for 45% and 50% solids are taken at about 25° C.; 60% solids about 38° C.

EXAMPLE 2

Pigmented Paper Coating Test

Pigmented paper coatings, prepared as in Example 1 with and without the gum blend of this invention, are applied to paper.

The test results of Table III are obtained. Readings for 45% and 50% solids are taken at about 25° C.; 60% solids about 38° C.

TABLE III

| | | Pigmented Paper Coating Test | | | |
|---|---|---|---|---|---|
| Coating | % Solid | Dry Coat Wt. (gm/m$^2$) | K & N Ink Mottle | Quick Peek | IGT Pick Test |
| w/o gum blend | 45 | 15.0 | 3 | 44 | 44.41 |
| | 45 | 22.6 | 4 | 44 | 47.51 |
| | 50 | 14.7 | 4 | 43 | 41.41 |
| | 50 | 20.7 | 5 | 55 | 47.49 |
| | 60 | 18.2 | 6 | 50 | 47.50 |
| | 60 | 25.2 | 7 | 66 | 55.53 |
| w/gum blend | 45 | 11.8 | 4 | 41 | 45.44 |
| | 45 | 18.9 | 5 | 52 | 50.50 |
| | 50 | 17.5 | 5 | 42 | 44.50 |
| | 50 | 21.3 | 6 | 55 | 57.55 |
| | 60 | 19.3 | 5 | 56 | 51.57 |
| | 60 | 27.7 | 6 | 60 | 59.62 |

These results indicate that there is no deterioration in the properties of the pigmented coating as a result of using the novel gum blend of this invention; i.e., surprisingly the guar gum containing blend has increased the viscosity of the pigment without flocculating with the clay.

EXAMPLE 3

Effect of Variation in Guar Content on Non-Pigmented Formulations

Five blends of this invention are prepared by combining a high viscosity sodium alginate (Kelgin ® HV), cold-water soluble tamarind gum, and guar gum.

The gum ratios are:

| Sample | |
|---|---|
| 3-1 | 20:72:8 |
| 3-2 | 20:64:16 |
| 3-3 | 20:56:24 |
| 3-4 | 20:48:32 |
| 3-5 | 20:40:40 |

These blends are then coated onto paper at 1% and 2% solids levels and the data of Table IV are obtained.

TABLE IV

| | | Variation In Guar Level | | | |
|---|---|---|---|---|---|
| Sample | % Solid | Brookfield LVF Model Viscosity (cP) 6 rpm | 60 rpm | K & N Ink Mottle | IGT Ink Drop |
| 3-1 | 1 | 250 | 190 | 5 | 565 |
| 3-1 | 2 | 3000 | 1800 | 6 | 659 |
| 3-2 | 1 | 400 | 280 | 4 | 504 |
| 3-2 | 2 | 5500 | 2700 | 6 | 702 |
| 3-3 | 1 | 500 | 320 | 4 | 566 |
| 3-3 | 2 | 8500 | 3425 | 6 | 613 |
| 3-4 | 1 | 600 | 420 | 4.5 | 497 |
| 3-4 | 2 | 13000 | 4600 | 7 | 612 |
| 3-5 | 1 | 1000 | 640 | 6 | 577 |
| 3-5 | 2 | 15750 | 4975 | 8 | 676 |

These data show that by increasing the percent of guar gum in the blends of this invention, there are obtained blends of increasing viscosity. These blends retain their utility as paper sizings.

EXAMPLE 4

Preparation of Cold-Water Soluble Tamarind Gum (CWSTG)

Tamarind kernel powder is dispersed in water to a concentration of 20%, heated to 95° C. for 10 minutes, then dried and milled. The resulting product is dissolved in water at 20° C. and develops a viscosity of 35 cP at 1% concentration, measured at room temperature on a Brookfield LVF viscometer, spindle 1, 60 rpm.

EXAMPLE 5

Preparation of Cold-Water Soluble Tamarind Gum (CWSTG)

Tamarind kernel powder is dispersed in water at ambient temperature at a concentration of 40%. The resulting paste is drum dried with internal steam pressure at 40 psi, and then milled. The resulting product readily dissolves in ambient-temperature water and imparts a viscosity of 30 cP at 1% concentration, measured on a Brookfield LVF viscometer, spindle 1, 60 rpm at room temperature.

EXAMPLE 6

Comparison of 20:50:30 Gum Blend vs. Guar Gum Alone

In order to compare the flocculating properties of the gum blend of this invention to guar gum, two pigmented coatings are prepared; one coating uses the 20:50:30 blend, the other uses guar gum alone. The coatings having the same formula as used in Example 1; the final solids are 60%. Interestingly, analytical tools such as viscosity readings (Brookfield, F-Shirley Rheogram, and Hercules Hi-shear Rheogram) do not distinguish significant differences between these two coatings as shown in Table V. However, the flocculation of the coating wherein guar gum alone is used is easily detected by spreading the coating on a glass plate. As it dries this coating achieves a mottled or cottage cheese-like appearance whereas the coating made from the gum blend of this invention dries smooth.

TABLE V

| | 20:50:30 Blend vs. Guar Gum | | | |
|---|---|---|---|---|
| Gum | Brookfield LVF 6 RPM | (cP)* 60 RPM | 6/60 RPM Ratio | Hercules Hi-shear |
| 20:50:30 Blend | 14,000 | 2300 | 6.1 | 20.5 |
| Guar | 17,500 | 3300 | 5.3 | 26.7 |

*25° C.

What is claimed is:

1. A blend of algin, TKP, and guar gum wherein the weight percents are:

| | |
|---|---|
| algin | 5%–90% |
| TKP | 5%–90% |
| guar gum | 5%–90% | with the proviso that the ratio of algin:(TKP plus guar gum) on a weight-weight basis range from about 90:10 to about 5:95 and the TKP is selected from the group consisting of tamarind kernel powder, cold-water soluble tamarind kernel powder, tamarind polysaccharide, tamarind seed jellose, and the tamarind kernel constituents.

2. The blend of claim 1 where the algin is sodium alginate or propylene glycol alginate.

3. The blend of claim 2 wherein algin is sodium alginate and TKP is selected from the group consisting of tamarind kernel powder, cold-water soluble tamarind kernel powder, tamarind polysaccharide, and tamarind seed jellose.

4. The blend of claim 3 wherein the algin is high viscosity sodium alginate and the TKP is cold-water soluble tamarind kernel powder.

5. The blend of claim 3 wherein the algin:(TKP plus guar gum) ratio ranges from 50:50 to 5:95.

6. The blend of claim 3 wherein the algin:(TKP plus guar gum) ratio ranges from 20:80 to 5:95.

7. A blend of claim 3 which comprises high viscosity sodium alginate, cold-water soluble tamarind gum, and guar gum in the ratio 20:50:30.

8. An aqueous blend of claim 3 prepared by prehydrating each gum prior to blending.

9. A non-pigmented paper coating composition consisting essentially of water, binder and algin:TKP:guar gum blend wherein the weight percents are:

| algin | 5%–90% |
| TKP | 5%–90% |
| guar gum | 5%–90% | with the proviso that the ratio of algin:(TKP plus guar gum) on a weight:weight basis range from about 90:10 to about 5:95 and the TKP is selected from the group consisting of tamarind kernel powder, cold-water soluble tamarind kernel powder, tamarind polysaccharide, tamarind seed jellose, and the tamarind kernel constituents.

10. The coating composition of claim 9 where relative to the total coating weight the blend weighs 0.01 to 35%.

11. The coating composition of claim 10 where the algin: (TKP plus guar gum) ratio ranges from 50:50 to 5:95.

12. The coating composition of claim 11 where the ratio ranges from 20:80 to 5:95.

13. The coating composition of claim 12 where relative to the total coating weight the blend weighs 0.5 to 15%.

14. A pigmented paper coating composition consisting essentially of water, pigment, binder and an algin:TKP:guar gum blend wherein the weight percents are:

| algin | 5%–90% |
| TKP | 5%–90% |
| guar gum | 5%–90% | with the proviso that the ratio of algin:(TKP plus guar gum) on a weight:weight basis range from about 90:10 to about 5:95 and the TKP is selected from the group consisting of tamarind kernel powder, cold-water soluble tamarind kernel powder, tamarind polysaccharide, tamarind seed jellose, and the tamarind kernel constituents.

15. The coating composition of claim 14 where the algin: (TKP plus guar gum) ratio ranges from 50:50 to 5:95.

16. The coating composition of claim 15 where the ratio ranges from 20:80 to 5:95.

17. The coating composition of claim 16 where relative to the pigment the blend weighs from 0.05 to 200%.

18. The coating composition of claim 16 where relative to the pigment the blend weighs from 0.05 to 50%.

19. The coating composition of claim 18 where relative to the pigment the blend weighs from 0.3 to 1.5%.

* * * * *